A. F. LANG.
BICYCLE SADDLE.
APPLICATION FILED NOV. 8, 1909.
951,014.
Patented Mar. 1, 1910.
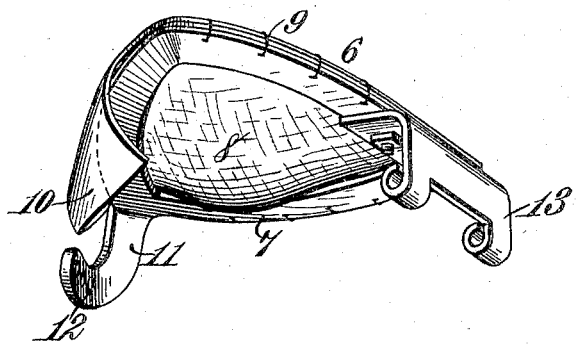
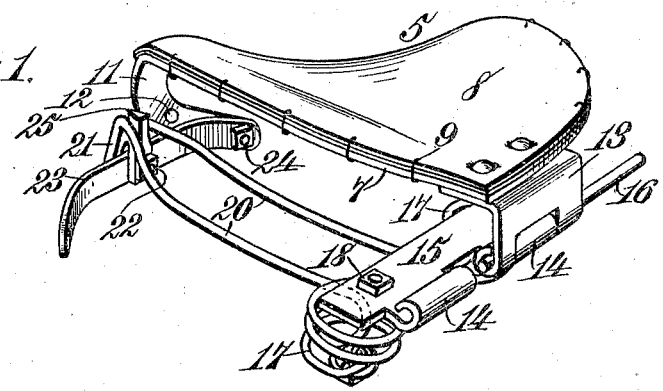
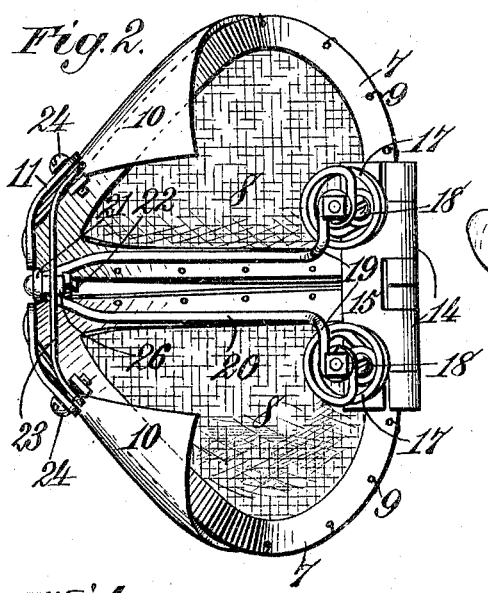
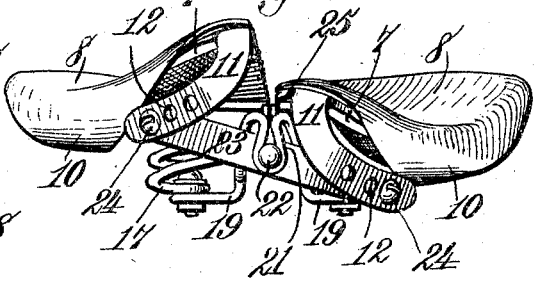
Witnesses.
Inventor.
Arthur F. Lang.
By James L. Norris
Atty.

UNITED STATES PATENT OFFICE.

ARTHUR F. LANG, OF SOUTH JACKSONVILLE, FLORIDA.

BICYCLE-SADDLE.

951,014. Specification of Letters Patent. Patented Mar. 1, 1910.

Application filed November 8, 1909. Serial No. 526,802.

*To all whom it may concern:*

Be it known that I, ARTHUR F. LANG, a citizen of the United States, residing at South Jacksonville, in the county of Duval and State of Florida, have invented new and useful Improvements in Bicycle-Saddles, of which the following is a specification.

This invention relates to bicycle saddles of that type embodying movable saddle sections which will conform to all the movements of the legs of the rider and will obviate injurious effects frequently resulting from the use of saddles having fixed seats.

The primary object of the invention is to provide a saddle having freely movable seat sections to permit use of the hip joints by the rider as well as the knee and ankle joints, and also to produce a simple and effective organization at a comparatively small expense and which by the freedom of movement of its seat sections will materially reduce the tiring effect on the rider and permit comfortable riding for greater distances than is possible with the ordinary form of saddle.

The invention consists in the construction and arrangement of the several parts which will be more fully hereinafter specified.

In the drawing: Figure 1 is a perspective view of a saddle embodying the features of the invention and showing one of the seat sections detached. Fig. 2 is a bottom plan view of the saddle. Fig. 3 is a front elevation of the same. Fig. 4 is a detail perspective view of a combined spreading and guide post.

The numerals 5 and 6 designate the seat sections which are each one-half of an ordinary bicycle seat, or the two sections are similar in their combined contour to the seat of an ordinary saddle. Each section has a frame 7 to which the covering 8 is attached, as for instance by stitches or connecting loops 9. The covering 8 of each saddle section may be of suitable material, preferably leather, and will be provided with a front skirt or guard 10. The frame 7 of each section has at the inner portion of its front extremity a downwardly projecting outwardly deflected attaching arm 11 provided with a plurality of openings 12 in its free extremity. To the rear of the frame 7 an angular hinge leaf 13 is secured, the hinge leaves of the two sections or frames 7 coöperating with and movably attached to knuckles 14 projecting from the rear edge of a frame bar 15, the leaves 13 and knuckles 14 being connected by a pintle rod 16 after the manner of an ordinary hinge. Secured to the under side of the frame bar 15 near opposite ends of the latter are coiled springs 17 which serve as cushion devices, the said springs having their upper terminals attached by bolts and nuts as at 18 to the frame bar and their lower terminals secured to the laterally deflected rear ends 19 of a forwardly projecting supporting loop 20 having its front end 21 contracted and bent downwardly to provide a seat for the fulcrum 22 of a yoke or compensating bar 23, the latter having its opposite ends adjustably connected to the free extremities of the arms 11 to modify the rise and fall of the seat sections in accordance with the desires of the rider. To accommodate application of the ends of the yoke or compensating bar 23 to the free extremities of the arms 11, the said ends are bent, as clearly shown by Figs. 1 and 2, separable nuts and bolts 24 being used to secure the ends of the bar 23 to the arms 11. The fulcrum 22 of the bar 23 consists of a headed stud or bolt applied through the medium of a nut engaging a screw-threaded shank, and this fulcrum also serves as a securing means for a combined spreading and guide post, shown in detail by Fig. 4, and having a shank 25 of triangular contour and a lower bifurcated extremity 26 to fit over the center of the bar, the members produced by the bifurcation being apertured to receive the headed stud or bolt forming the fulcrum 22. The reduced edge of the shank of the post projects forwardly between the upper contracted portion of the front extremity of the supporting loop 20 and the opposite members of this loop ride over or move on the opposite sides of said shank and are prevented from collapsing beyond a predetermined extent as well as guided in their movement by the said post.

The saddle as a whole will be applied through the medium of the ordinary form of seat post secured to the saddle in any preferred manner.

From the foregoing the operation of the saddle will be obviously apparent. One section of the seat or saddle will be depressed and the other elevated to correspond to the movements of the pedals, and by this means the hip joints will come into play and a lift will be exerted alternately on the legs of the rider. These sections in their movements will be cushioned through the supporting loop 20 by the springs 17 so as to avoid detrimental shocks or jars, and, furthermore, vibrations will be materially absorbed by the said springs. The movements of the hip joints permit considerable relaxation and remove the tiresome position necessarily assumed by a rider using the ordinary form of saddle and as a sequence greater distances can be run without increasing the fatigue of the rider. Another advantage is that no injury will result to the rider in view of the movement or automatic adjustment of the seat or saddle sections to correspond to the alternate rise and fall of the limbs of the rider. The parts of the improved saddle may be very readily assembled or dissociated and are strong and durable in their structure.

What is claimed is:

1. In a bicycle saddle, the combination of two hinged seat sections having depending laterally extending arms at their front extremities, and a yoke means to which the said arms are adjustably connected.

2. In a bicycle saddle, the combination of two seat sections, a frame bar to which the said sections are hinged, and a yoke means to which the front extremities of the sections are adjustably attached.

3. In a bicycle saddle, the combination of a frame bar having knuckles at the rear edge thereof, seat sections having hinge leaves movably connected to said knuckles, and means to which the front extremities of the seat sections are adjustably attached.

4. In a bicycle saddle, the combination of a frame bar having knuckles at the rear edge thereof, seat sections having hinge leaves movably connected to said knuckles, and an intermediately fulcrumed compensating bar to which the front extremities of the seat sections are adjustably connected.

5. In a bicycle saddle, the combination of seat sections hinged at their rear extremities, springs coöperating with and disposed under the rear portions of the seat sections, a supporting loop connected to the springs and having a front reduced extremity holding a fulcrum means, and a yoke means intermediately engaged by said fulcrum means and connected to the front extremities of the seat sections.

6. In a bicycle saddle, the combination of seat sections hinged at their rear extremities, springs coöperating with and disposed under the rear portions of the seat sections, a supporting loop connected to the springs and having a front reduced extremity holding a fulcrum means, a yoke means intermediately engaged by said fulcrum means and connected to the front extremities of the seat sections, and a combined guiding and spreading post mounted over the yoke means between the front portions of the supporting loop.

7. In a bicycle saddle, the combination of hinged seat sections, a supporting loop thereunder, a yoke means fulcrumed to the front extremity of the supporting loop, the front extremities of the seat sections being adjustably attached to the opposite ends of the yoke means, and an upwardly projecting post carried by the yoke means and disposed between the members of the supporting loop.

In testimony whereof I have hereunto set my hand in presence of two subscribing witnesses.

ARTHUR F. LANG.

Witnesses:
C. H. ASHMEAD,
M. H. DANCY.